(12) United States Patent
Cooks, Jr.

(10) Patent No.: US 6,212,746 B1
(45) Date of Patent: Apr. 10, 2001

(54) RETAINING RING INSTALLATION APPARATUS

(75) Inventor: Robert Cooks, Jr., Cincinnati, OH (US)

(73) Assignee: Hill-Rom, Inc., Batesville, IN (US)

( * ) Notice: Subject to any disclaimer, the term of this patent is extended or adjusted under 35 U.S.C. 154(b) by 0 days.

(21) Appl. No.: 09/428,258

(22) Filed: Oct. 27, 1999

(51) Int. Cl.[7] .................................................. B23P 11/00
(52) U.S. Cl. ........................... 29/243.56; 29/809; 29/225
(58) Field of Search ............................. 29/222, 225, 229, 29/243.56, 809, 243.5

(56) References Cited

U.S. PATENT DOCUMENTS

| | | |
|---|---|---|
| 2,172,847 | 9/1939 | Nydegger et al. . |
| 2,329,275 | 9/1943 | Lenehan . |
| 2,480,037 | 8/1949 | Luckins . |
| 2,483,379 | 9/1949 | Brell . |
| 2,814,858 * | 12/1957 | Erdmann ................................ 29/229 |
| 2,870,529 * | 1/1959 | Erdmann ................................ 29/229 |
| 2,895,214 | 7/1959 | Erdmann . |
| 2,930,114 | 3/1960 | Erdmann . |
| 2,958,123 | 11/1960 | Erdmann . |
| 2,978,801 | 4/1961 | Erdmann . |
| 2,991,546 * | 7/1961 | Erdmann ................................ 29/229 |
| 2,995,811 | 8/1961 | Erdmann . |
| 3,040,419 | 6/1962 | Erdmann . |
| 3,054,169 | 9/1962 | Bourque . |
| 3,134,168 | 5/1964 | Erdmann . |
| 3,200,488 | 8/1965 | Johansson . |
| 3,266,133 | 8/1966 | Kalbow . |
| 3,268,993 | 8/1966 | Conner . |
| 3,448,507 | 6/1969 | Jackson et al. . |
| 3,495,317 * | 2/1970 | Kasper ................................ 29/229 |
| 3,623,635 | 11/1971 | Erdmann . |
| 3,846,900 | 11/1974 | Weglage . |
| 4,099,444 | 7/1978 | Millheiser et al. . |
| 4,550,485 | 11/1985 | Killian . |
| 4,581,481 | 4/1986 | Moretti . |
| 4,592,122 | 6/1986 | Sikula . |
| 4,667,399 | 5/1987 | Berliner . |
| 5,146,676 | 9/1992 | Cuba . |
| 5,588,204 | 12/1996 | Rossman . |

* cited by examiner

Primary Examiner—Tom Hughes
Assistant Examiner—Jermie E. Cozart
(74) Attorney, Agent, or Firm—Bose McKinney & Evans LLP

(57) ABSTRACT

An apparatus for installing clips onto workpieces which includes a spring biased alignment mechanism which positions a workpiece for the installation of a retaining clip thereon and thereafter, causes the workpiece to be ejected from the apparatus.

43 Claims, 3 Drawing Sheets

RETAINING RING INSTALLATION APPARATUS

BACKGROUND AND SUMMARY OF THE INVENTION

The present invention relates to the installation of spring retaining rings onto workpieces, assemblies and subassemblies. More particularly, the present invention is directed to a method and apparatus for installing spring retainer rings onto workpieces, assemblies and subassemblies.

Many types of assemblies use open spring retaining rings for retaining elongated elements such as shafts, sleeves, rods, pins, etc. in an assembled relationship with other component parts which typically have openings through which the elongated elements extend. The open spring retaining rings are often small in size and are installed in grooves or recesses in the elongated elements by deflecting the free ends of the legs of the rings so that they can pass around the grooved or recessed portion of an elongate element. Once the free ends of the rings clear the diameter of the grooved or recessed potion, the free ends of the rings snap back to secure the rings in place.

Proper installation of a spring retaining ring is essential. A properly installed spring retaining ring locks itself against the corresponding groove or recess with a holding power that enables the ring to resist forces directed along a longitudinal axis of the workpiece as well as impact and shock forces, so as to prevent undesirable shifting of the ring and parts mounted in the workpiece.

The increased use of spring retaining rings in assemblies and subassemblies has resulted in the production of numerous apparatuses which are designed to install spring retaining rings. The following U.S. Patents exemplify various spring retaining ring configurations and installation apparatuses and include U.S. Pat. Nos. 2,172,847; 3,200,488; 2,329,275; 3,266,133; 2,480,037; 3,268,993; 2,483,379; 3,448,507; 2,895,214; 3,623,635; 2,930,114; 3,846,900; 2,958,123; 4,099,444; 2,978,801; 4,550,485; 2,995,811; 4,581,481; 3,040,419; 4,592,122; 3,054,169; 4,667,399; 3,134,168; 5,146,676; and 5,588,204.

The present invention provides a method and apparatus for installing spring retainer rings onto workpieces, assemblies and subassemblies which includes among other features the ability to align and release workpieces.

According to other features, characteristics, embodiments and alternatives of the present invention which will become apparent as the description thereof proceeds below, the present invention provides an apparatus for installing retaining clips onto workpieces which includes a pusher movable to push a retaining clip onto a workpiece, an actuator moving the pusher in a reciprocal manner along a path that is substantially perpendicular to a longitudinal axis of the workpiece, and a guide configured to receive and store a plurality of retaining clips. The guide is configured to position a lead retaining clip of said plurality of retaining clips into the path of the pusher. The apparatus also includes a clip installation cavity including an opening into which a workpiece is positioned for installation of a retaining clip thereon, the clip installation cavity being positioned in the path of the pusher, and a yieldably biased workpiece alignment member engaging a workpiece placed in the clip installation cavity to align a groove in the workpiece with the path of the pusher so that a retaining clip pushed by the pusher along the path of the pusher is installed in the groove of the workpiece. The yieldably biased workpiece alignment member reciprocates parallel to the path of the pusher by moving in a first direction during installation of the retaining clip onto the workpiece and by moving in a second direction opposite to the first direction after installation of the retaining clip on the workpiece.

In an illustrated embodiment, an apparatus for installing retaining clips onto workpieces comprises a housing, a pusher carried by the housing and movable to push a retaining clip onto a workpiece, an actuator moving the pusher in a first direction to install the retaining clip on the workpiece and retracting the pusher in a second direction after installation of the retaining clip on the workpiece, a yieldably biased workpiece alignment member carried by the housing and engaging and positioning a workpiece, and a guide coupled to the housing and configured to receive and store a plurality of retaining clips. The guide is configured to position a lead retaining clip in front of the pusher. The apparatus also includes a clip installation cavity defined in the housing and being located adjacent the yieldably biased workpiece alignment member. The yieldably biased workpiece alignment member is engaged by the retaining clip and moved in the first direction out of engagement with the workpiece during movement of the pusher in the first direction. The yieldably biased workpiece alignment member engages the retaining clip to move the retaining clip and workpiece in the second direction to initiate ejection of the workpiece with the retaining clip installed thereon during movement of the pusher in the second direction.

BRIEF DESCRIPTION OF DRAWINGS

The present invention will be described hereafter with reference to the attached drawings which are given as non-limiting examples only, in which.

DETAILED DESCRIPTION OF THE DRAWINGS

The present invention is directed to apparatus and methods for installing spring retainer rings onto workpieces, assemblies and subassemblies. The apparatus includes a clip feeding and installation mechanism and an actuator. The clip feeding and installation mechanism includes a guide for receiving a plurality of clips and for aligning leading clips, one at a time, into the path of a clip installation device which includes a pusher. The pusher is moved in a reciprocal manner by the actuator which can be a pneumatic, hydraulic, electromagnetic, or any other suitable type of actuator.

The apparatus includes a clip installation cavity into which a workpiece having a groove is positioned to receive a clip. The apparatus is provided with a means to position and align a workpiece so that a groove formed therein is in the path of a clip which is pushed by the pusher toward the workpiece. The means to position and align the workpiece includes a spring biased groove locator which can also be used to eject a workpiece from the clip installation cavity after a clip has been installed thereon. The spring biased groove locator can eject a workpiece by pushing the workpiece against an inclined surface which directs or deflects the workpiece out of the clip installation cavity.

The spring biased groove locator is designed to engage a workpiece until a clip is inserted thereon. As the clip is pushed into the groove of the workpiece, the clip engages the groove locator and pushes the groove locator against the spring biasing force away from the workpiece. Once a clip is installed on the workpiece and the pusher is retracted away from the clip, the groove locator is moved by the spring biasing force to eject the workpiece with the clip installed thereon. The pusher engages one side of the workpiece and the groove locator engages the other side of the workpiece.

The apparatus of the present invention can be used to install various types of clips on workpieces, including E-clips and C-clips.

Figure 1:
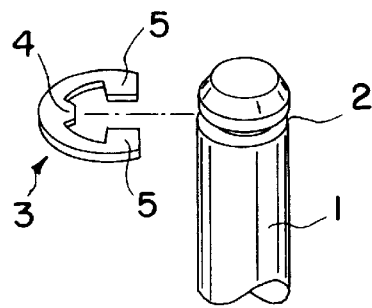
FIG. 1 is a perspective view of a workpiece having a spring retaining ring aligned with a groove in the workpiece for installation therein.
Figure 3:
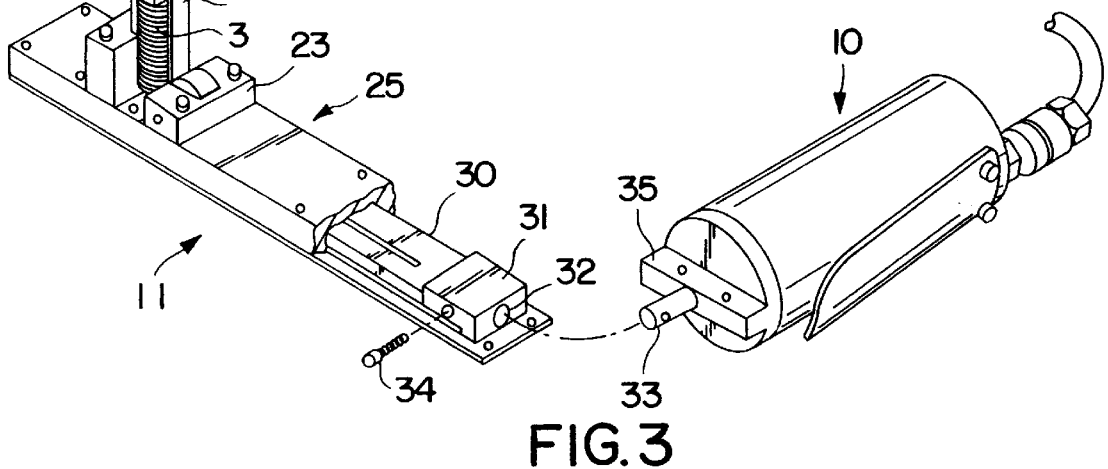
FIG. 3 is a perspective view of a hand held spring retaining ring installation apparatus which depicts how the actuator can be coupled to the clip feeding and installation mechanism.

FIG. 1 is a perspective view of a workpiece 1 having a spring retaining ring or clip 3 aligned with a groove in the workpiece for installation therein. The workpiece 1 includes a groove 2 adjacent an end thereof which can be beveled or rounded if desired. The groove 2 has a width which is slightly greater than the thickness of spring retaining clip 3. The retaining clip 3 depicted in FIG. 3 is of a type that is referred to as an E-clip because of the radially inward directed protrusions which include a central protrusion 4 and two protrusions 5 formed on the ends of the clip. The E-clip is sized so that the central protrusion 4 abuts against the central diameter of groove 2 and the protrusions 5 on the free ends of the E-clip received in groove 2 and engage the workpiece to secure the clip 3 to the workpiece 1. It is to be understood that other types of spring clips could be used in conjunction with the apparatus of the present invention.

Figure 2:
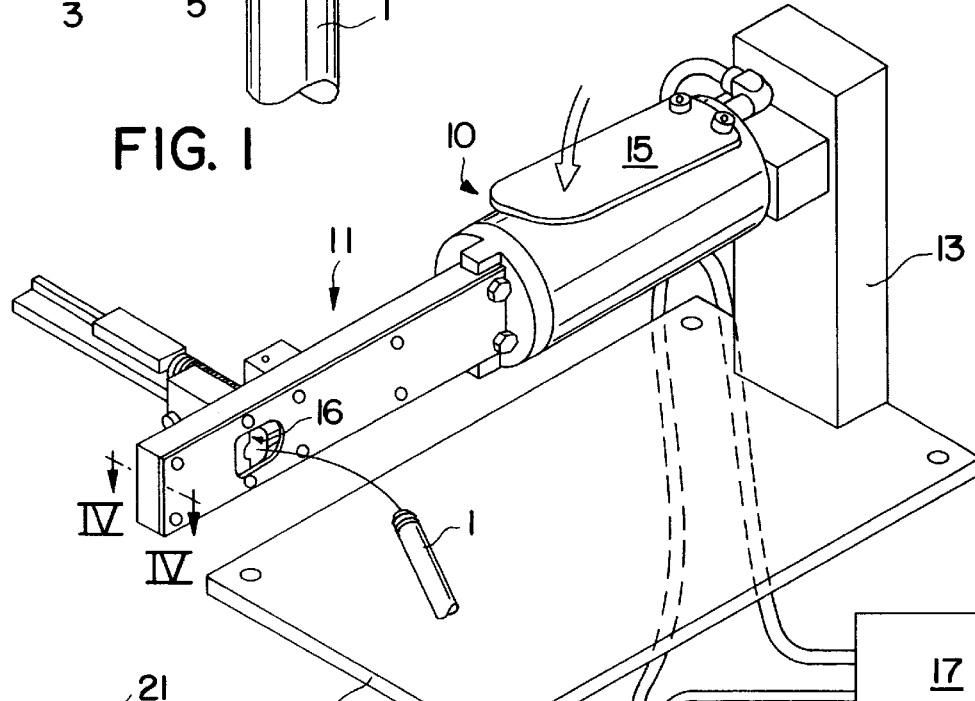
FIG. 2 is a perspective view of a spring retaining ring installation apparatus which is mounted to and held in place by a fixture according to one embodiment of the present invention.

FIG. 2 is a perspective view of a spring retaining ring installation apparatus according to one embodiment of the present invention. The apparatus of the present invention includes an actuator 10 and a clip feeding and installation mechanism 11.

These components can be used together in the form of a hand-held unit as shown in FIG. 3, or mounted to a support 13 for use as depicted in FIG. 2. The apparatus depicted in FIG. 2 includes a base 12 and support 13 to which the actuator 10 is mounted. In addition, a foot operated switch 14 can be coupled to actuator 10 so that an operator's hands can be free to handle, i.e. feed and remove, workpieces upon which spring retaining rings are installed. In embodiments of the apparatus which are hand-held, a convenient switch 15 such as a trigger, button or the like can be used to operate the actuator 10. FIG. 2 depicts a supply of pressurized air 17 which can be used to operate actuator 10, when switch 14 or 15 is depressed.

FIG. 2 depicts how workpiece 1 would be positioned in the clip installation cavity 16 of the clip feeding and installation mechanism 11. It is to be understood that the clip feeding and installation mechanism 11 can be oriented in different positions than that illustrated in FIG. 2.

FIG. 3 is a perspective view which depicts how the actuator can be coupled to the clip feeding and installation mechanism. The clip feeding and installation mechanism 11 includes a spring biased clip feeding assembly 20 which includes a clip guide 21 upon which a plurality of spring retaining clips 3 can be positioned and slid. Clip guide 21 is also referred to as a T-bar by those skilled in the art. A spring element 22 is coupled between a base 23 into which the spring element 22 preferably of the constant force type, is biased to retract, and a follower shoe 24. The base 23 which is attached to housing 25 of the clip feeding and installation mechanism 11 can include a fixed shaft or pin upon which the spring element 22 is wound so as to be retractable when the free end thereof is pulled outward from the base 23. The shoe 24 transfers the biasing force acting upon spring element 22 to the plurality of spring retaining clips 3 which are "stacked" on guide 21. In an alternative embodiment, the spring element 22 could be replaced with an elongate retractable element which is wound around a spring biased reel or drum provided in base 23.

FIG. 3 is cut away to illustrate pusher 30 which slides within housing 25 of clip feeding and installation mechanism 11. Pusher 30 comprises a relatively thin elongate member that can be coupled to actuator 10 by a coupling element 31. The coupling element 31 is fixed to an end of pusher 30 and includes a bore 32 into which piston 33 of actuator 10 can be received and secured by set screw or bolt 34. Actuator 10 can comprise a pneumatic, hydraulic, electromagnetic, or any other suitable type of actuator. The front of actuator 10 can include a mounting bracket 35 to which the housing 25 of the clip feeding installation mechanism 11 can be coupled by mechanical fasteners 36 as shown in FIG. 4.

Figure 4:
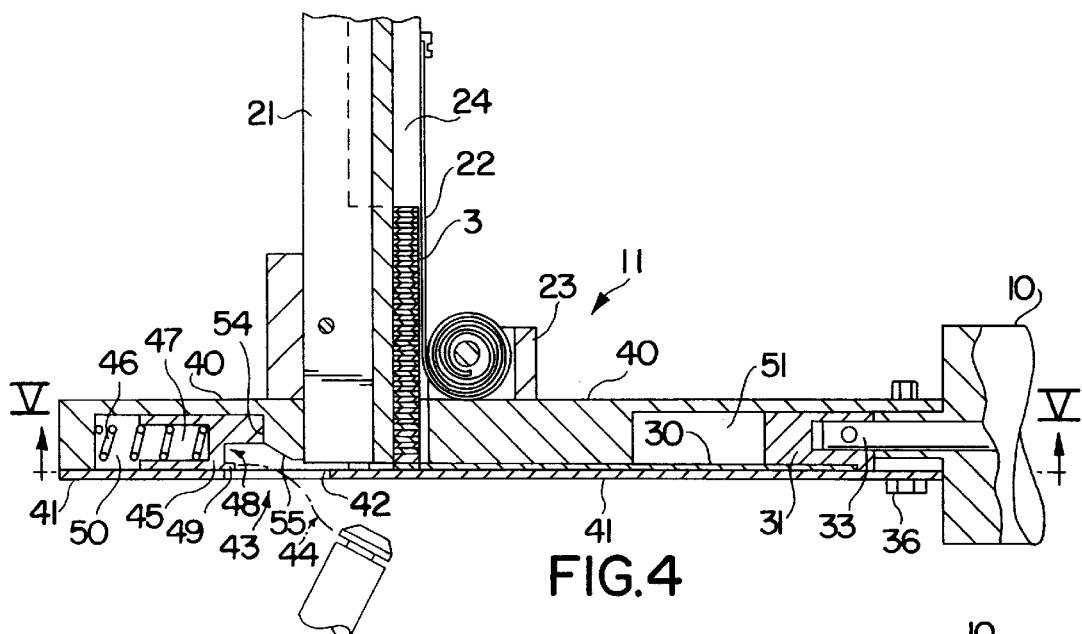
FIG. 4 is a cross-sectional side view of the clip feeding and installation mechanism taken along line IV—IV of FIG. 2 which depicts the pusher in a retracted position.
Figure 5:
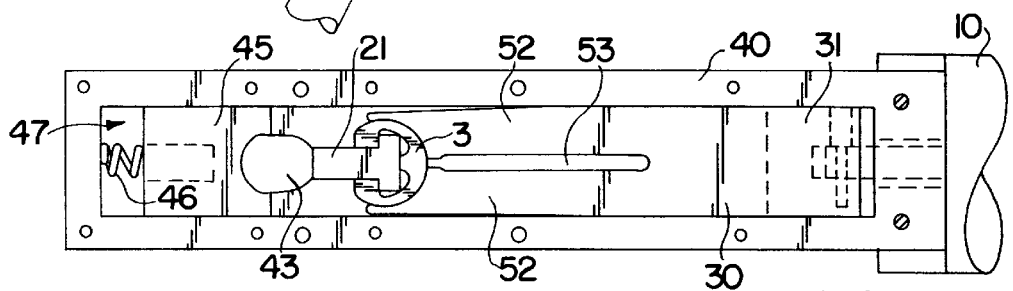
FIG. 5 is a bottom view of the clip feeding and installation when plate 41 is removed as taken along plane V—V in FIG. 4.

FIG. 4 is a cross-sectional side view of the clip feeding and installation mechanism 11 of FIG. 2 which depicts the pusher 30 in a retracted position. As shown in FIG. 4, the pusher 30 is positioned between a side plates 40 and 41 of housing 25. Side plate 41 which is opposite clip guide 21 includes an opening 42 which defines clip installation cavity 43. In FIG. 4 the manner in which a workpiece 1 is positioned in clip installation cavity 43 is illustrated by broken line 44. The clip feeding and installation mechanism 11 includes a groove locator 45 which is positioned between side plates 40 and 41. The groove locator 45 is biased into engagement with a shoulder 54 of plate 40 of housing 25 by spring element 46 which is received in a bore 47 provided in groove locator 45. The end of groove locator 45 which is adjacent clip installation cavity 43 includes an undercut profile 48 defined by a lip 49 having a concave shaped as depicted in FIG. 5. The undercut profile 48 of groove locator 45 is configured to receive the end of a workpiece so that the lip 49 enters groove 2 (see FIG. 7). In FIG. 4, it can be seen that housing 25 includes cavities 50 and 51 within which groove locator 45 and piston coupling element 31 can move.

Grove locator 45 is constructed so that lip 49 is aligned with pusher 30 and with the lead clip 3 pushed by pusher 30. In use, prior to installation of a clip 3 into workpiece 1, workpiece 1 is inserted through opening 42 and is oriented so that lip 49 is received in groove 2. Receipt of lip 49 is groove 2 insures that groove is properly aligned with the lead clip 3 to be installed therein. Those skilled in the art will appreciate that shafts, rods, etc., such as workpiece 1 are typically manufactured with a fairly loose length tolerance (i.e., the tolerance between the ends of the workpiece can vary widely) and with a fairly tight tolerance as to the spacing between grooves 2 formed in the workpiece. Therefore, because the position of workpiece 1 is based on groove 2 itself rather than being based on the location of groove 2 relative to an end of the workpiece 1, the apparatus provides for very reliable installation of clips 3 onto workpiece 1.

FIG. 5 is a bottom view of the clip feeding and installation mechanism 11 taken along plane V—V in FIG. 4. FIG. 5 is essentially a view of the clip feeding and installation mechanism with side plate 41 removed. As shown in FIG. 5, the clips 3 positioned on guide 21 are aligned so that the leading clip is received in arms 52 formed in pusher 30. In this regard, the front end of pusher 30 includes two arms 52 which are defined by an enlarged slot 53 which extends along the center of pusher 30 as shown. The ends of arms 52 form a concave curved shape which is complementary to the curved shape of clips 3. Arms 52 formed on pusher 30 are designed to flex or spread apart simultaneously as a clip 3 being pushed by pusher 30 flexes or spreads to engage a workpiece 1. FIG. 5 depicts arm 52 of pusher 30 as they receive the lead clip 3 from guide 21.

Figure 6:
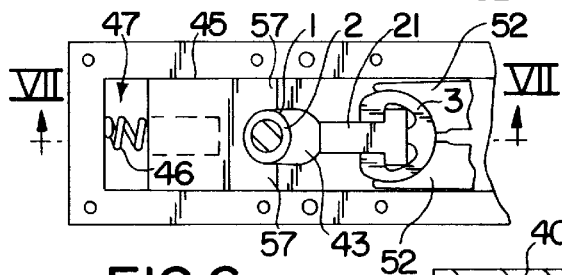
FIG. 6 is a partially cut away bottom view of the clip feeding and installation mechanism which depicts a workpiece positioned in the clip installation cavity.

FIG. 6 is a partially cut away bottom view of the clip feeding and installation mechanism which depicts a workpiece positioned in the clip installation cavity. As shown, lip 49 of groove locator 45 has a concave curved shape which is complementary to the diameter of a workpiece 1 at groove 2.

Figure 7:
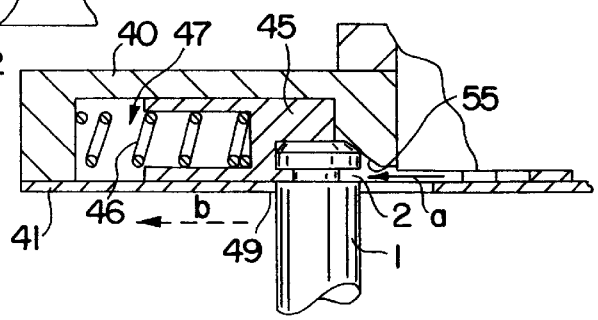
FIG. 7 is a cross-sectional side view of the clip feeding and installation mechanism taken along plane VII—VII in FIG. 6.

FIG. 7 is a cross-sectional side view of the clip feeding and installation mechanism taken along plane VII—VII in FIG. 6. FIG. 7 best depicts how the end of workpiece 1 is received in undercut portion 48 of the end of groove locator 45 and how the lip 49 of groove locator 45 is received in groove 2 of workpiece 1. FIG. 7 also illustrates how side plate 40 can be provided with an inclined surface 55 that will help guide a workpiece 1 into the position shown in FIG. 7.

In operation, once a workpiece 1 is positioned in the clip installation cavity 43 as shown in FIG. 7, the operator activates actuator 10. Upon actuation, piston 33 of actuator 10 moves pusher 30 forward toward clip installation cavity 43. As pusher 30 moves forward, a leading clip 3 from the plurality of clips 3 on guide 21 is received between arms 52 of pusher 30 and moved toward the workpiece 1 positioned in installation cavity 43. Movement of clip 3 is depicted by arrow "a" in FIG. 7.

Spring element 46 provides a biasing force against workpiece 1 which is sufficient to allow the force of piston 33, acting through pusher 30 to install clip 3 onto workpiece 1. As clip 3 is installed on workpiece 1, the leading edge of clip 3 contacts groove locator 45 so that the force applied to clip 3 by pusher 30 moves groove locator 45 against spring element 46 in the direction indicated by arrow "b" in FIG. 7.

When piston 33 is returned by actuator 10, spring element 46 pushes groove locator 45 in a direction toward the actuator 10. When the end of workpiece 1 contacts and is pushed against inclined surface 55 the resulting force will tend to eject workpiece 1 from the clip installation cavity 43. The leading edge of lip 49 is provided with opposed side portions 57.

Figure 8:
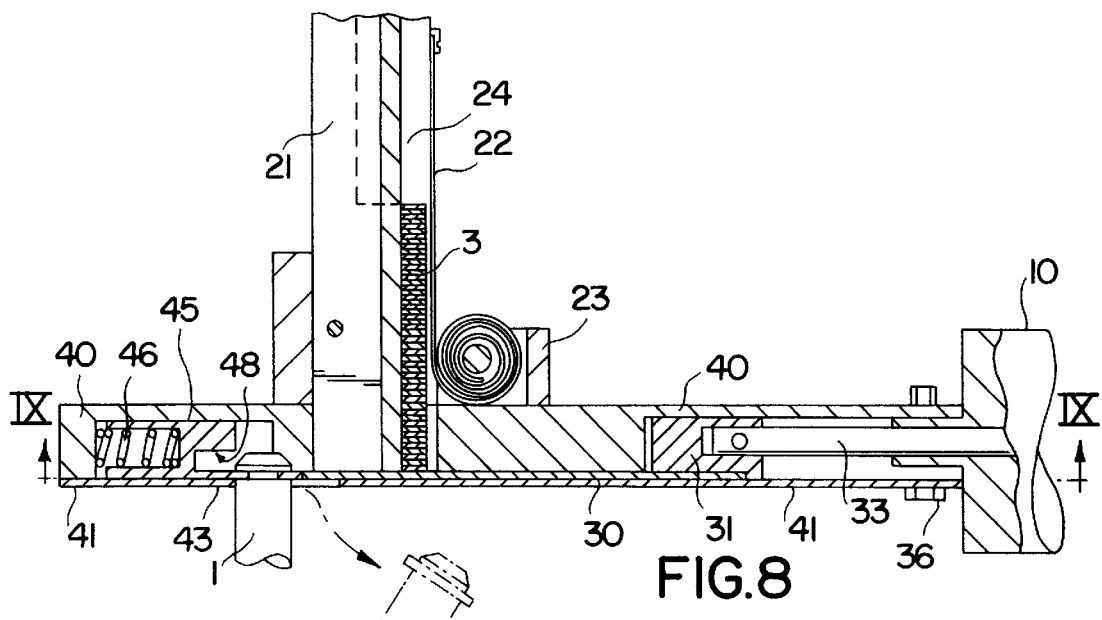
FIG. 8 is a cross-sectional side view of the clip feeding and installation mechanism of FIG. 2 which depicts the pusher in an extended position.

FIG. 8 is a cross-sectional side view of the clip feeding and installation mechanism of FIG. 2 which depicts the pusher in an extended position. In FIG. 8 clip 3 is installed on workpiece 1 and the leading edge of clip 3 contacts the leading edge of lip 49. In this state, force applied to the pusher 30 from piston 33 acts through installed clip 3 and pushes groove locator 45 away from the clip installation cavity 43.

Figure 9:
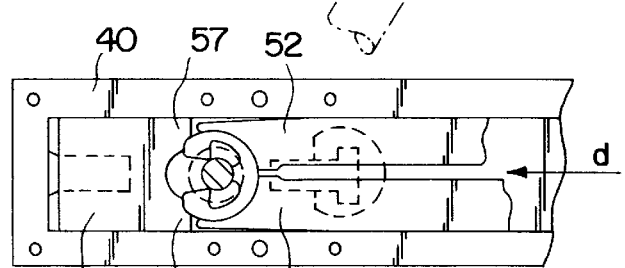
FIG. 9 is a bottom view of the clip feeding and installation mechanism when plate 41 is removed as taken along plane IX—IX in FIG. 8.

FIG. 9 is a bottom view of the clip feeding and installation mechanism 11 taken along plane IX—IX in FIG. 8. In FIG. 9 the manner in which the edges of the open ends 5 of clip 3 contact leading edge of lip 49 is illustrated. Force applied by pusher 30 in the direction of arrow "d" is transferred to groove locator 45 and overcomes the biasing force of spring element 46.

Figure 10:
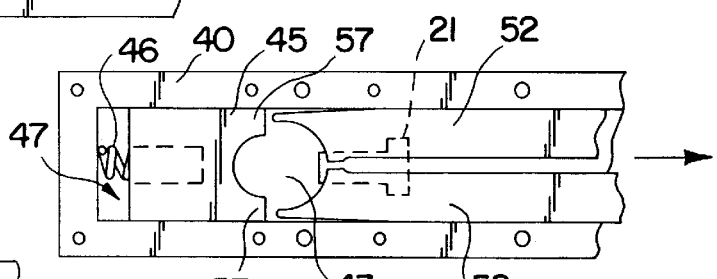
FIG. 10 is a partially cut away bottom view of the clip feeding and installation mechanism.

FIG. 10 is a partially cut away bottom view of the clip feeding and installation mechanism. Once piston 33 is retracted by actuator 10, spring element 46 urges groove locator 45 toward clip installation cavity 43. As groove locator 45 moves, it pushes against installed clip 3 until the end of workpiece 1 contacts inclined surface 55. Upon contacting inclined surface 55, workpiece 1 with clip installed thereon is ejected from clip installation cavity 43.

Figure 11:
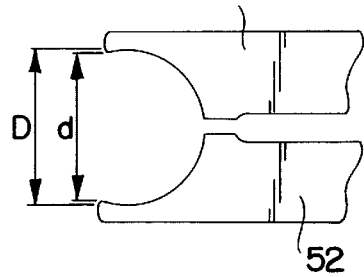
FIG. 11 is a bottom view of the free end of the pusher which depicts the shape thereof.

FIG. 11 is a bottom view of the free end of the pusher which depicts the shape thereof. The initial concave curved shape formed by the arms 52 of pusher 30 may include leading edges which extend around a clip 3 by a distance which is half the difference between the diameter "D" of the curved shape and the width "d" of the opening between the ends of arms 52. This distance by which the arms 52 extend around a clip 3 can be dictated by the radius of the curved shape, bearing in mind that the effective radius of a clip 3 will increase during and after it is installed on a workpiece. Accordingly, after a clip 3 held between arms 52 is installed on a workpiece, the radius of curvature will increase (as the slot 53 widens) so that the distance between the ends of arms 52 will be approximately equal to the diameter of an installed clip 3, thus allowing the pusher 30 to easily release an installed clip.

Figure 12:
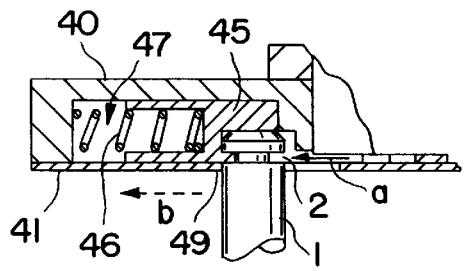
FIG. 12 is a cross-sectional view similar to FIG. 7 which shows an alternative embodiment of the present invention.

FIG. 12 is a cross-sectional view similar to FIG. 7 which shows an alternative embodiment of the present invention. In the embodiment of the invention depicted in FIG. 12, there is no inclined surface 55. In this embodiment, the workpieces 1 having clips 3 installed thereon can be manually removed from the installation cavity 43 or drop out under the influence of gravity. A slight clearance is provided about the end of the workpiece 1.

Although the present invention has been described with reference to particular means, materials and embodiments, from the foregoing description, one skilled in the art can easily ascertain the essential characteristics of the present invention and various changes and modifications may be made to adapt the various uses and characteristics without departing from the spirit and scope of the present invention as described by the claims which follow.

What is claimed:

1. An apparatus for installing retaining clips onto workpieces having longitudinal axes, the apparatus comprising:

a pusher movable to push a retaining clip onto a workpiece;

an actuator moving the pusher in a reciprocal manner along a path that is substantially perpendicular to a longitudinal axis of the workpiece;

a guide configured to receive and store a plurality of retaining clips, the guide being configured to position a lead retaining clip of said plurality of retaining clips into the path of the pusher;

a clip installation cavity including an opening into which the workpiece is positioned for installation of a retaining clip thereon, the clip installation cavity being positioned in the path of the pusher; and a yieldably biased workpiece alignment member engaging the workpiece placed in the clip installation cavity to align a groove in the workpiece with the path of the pusher so that a retaining clip pushed by the pusher along the path of the pusher is installed in the groove of the workpiece, the yieldably biased workpiece alignment member reciprocating parallel to the path of the pusher by moving in a first direction during installation of the retaining clip onto the workpiece and by moving in a second direction opposite to the first direction after installation of the retaining clip on the workpiece.

2. An apparatus for installing retaining clips onto workpieces according to claim 1, wherein the actuator is selected from the group consisting of pneumatic, hydraulic and electromagnetic actuators.

3. An apparatus for installing retaining clips onto workpieces according to claim 1, further comprising a housing formed to include an inclined surface and the workpiece being pushed into contact with the inclined surface during movement of the yieldably biased workpiece alignment member in the second direction.

4. An apparatus for installing retaining clips onto workpieces according to claim 3, wherein the inclined surface is oriented to deflect the workpiece so that the workpiece is ejected from the clip installation cavity.

5. An apparatus for installing retaining clips onto workpieces according to claim 1, wherein the yieldably biased workpiece alignment member is formed to include a curved portion that engages the workpiece prior to installation of the retaining clip on the workpiece and that engages the retaining clip subsequent to installation of the retaining clip on the workpiece.

6. An apparatus for installing retaining clips onto workpieces according to claim 1, further comprising a spring configured to yieldably bias the yieldably biased workpiece alignment member toward the pusher.

7. An apparatus for installing retaining clips onto workpieces according to claim 6, wherein the spring is a coil spring.

8. An apparatus for installing retaining clips onto workpieces according to claim 7, wherein the yieldably biased workpiece alignment member is formed to include a bore and at least a portion of the coil spring is received in the bore.

9. An apparatus for installing retaining clips onto workpieces according to claim 7, wherein the coil spring is oriented parallel with the path of the pusher.

10. An apparatus for installing retaining clips onto workpieces according to claim 1, wherein the pusher comprises a flat elongate member.

11. An apparatus for installing retaining clips onto workpieces according to claim 10, wherein the pusher includes a central slot that opens at a free end of the pusher.

12. An apparatus for installing retaining clips onto workpieces according to claim 1, further comprising a hand operable switch that is movable to actuate the actuator and a foot operable switch that is movable to actuate the actuator.

13. An apparatus for installing retaining clips onto workpieces which comprises:

a pusher for pushing a retaining clip onto a workpiece;

an actuator for driving the pusher in a reciprocal manner along a path;

a guide for receiving and storing a plurality of retaining clips and for positioning a lead retaining clip of said plurality of retaining clips into the path of the pusher;

a clip installation cavity including an opening into which the workpiece is positioned for installation of a retaining clip thereon, the clip installation cavity being positioned in the path of the pusher; and a spring biased workpiece alignment member for receiving the workpiece placed in the clip installation cavity and for aligning a groove in the workpiece with the path of the pusher so that a retaining clip pushed by the pusher along the path of the pusher is installed in the groove of the workpiece, the pusher and spring biased workpiece alignment member being configured to provide sufficient clearance so that as the pusher is retracted by the actuator, the workpiece having a retaining clip installed thereon can be removed from the clip installation cavity, the pusher and spring biased workpiece alignment member being positioned in a housing which includes an inclined surface against which the spring biased workpiece alignment member pushers the workpiece when the pusher is retracted.

14. An apparatus for installing retaining clips onto workpieces according to claim 13, wherein the inclined surface is oriented to deflect the workpiece so that the workpiece is ejected from the clip installation cavity.

15. An apparatus for installing retaining clips onto workpieces which comprises:

a pusher for pushing a retaining clip onto a workpiece;

an actuator for driving the pusher in a reciprocal manner along a path;

a guide for receiving and storing a plurality of retaining clips and for positioning a lead retaining clip of said plurality of retaining clips into the path of the pusher;

a clip installation cavity including an opening into which the workpiece is positioned for installation of a retaining clip thereon, the clip installation cavity being positioned in the path of the pusher; and a spring biased workpiece alignment member for receiving the workpiece placed in the clip installation cavity and for aligning a groove in the workpiece with the path of the pusher so that a retaining clip pushed by the pusher along the path of the pusher is installed in the groove of the workpiece, the pusher and spring biased workpiece alignment member being configured to provide sufficient clearance so that as the pusher is retracted by the actuator, the workpiece having a retaining clip installed thereon can be removed from the clip installation cavity, the spring biased workpiece alignment member including an undercut profile which receives an end of the workpiece.

16. An apparatus for installing retaining clips onto workpieces according to claim 15, wherein the workpiece alignment member includes a lip which is positioned to be received in the groove of the workpiece.

17. An apparatus for installing retaining clips onto workpieces which comprises:

a pusher for pushing a retaining clip onto a workpiece;

an actuator for driving the pusher in a reciprocal manner along a path;

a guide for receiving and storing a plurality of retaining clips and for positioning a lead retaining clip of said plurality of retaining clips into the path of the pusher;

a clip installation cavity including an opening into which the workpieces is positioned for installation of a retaining clip thereon, the clip installation cavity being positioned in the path of the pusher; and a spring biased workpiece alignment member for receiving the workpiece placed in the clip installation cavity and for aligning a groove in the workpiece with the path of the pusher so that a retaining clip pushed by the pusher along the path of the pusher is installed in the groove of the workpiece, the pusher and spring biased workpiece alignment member being configured to provide sufficient clearance so that as the pusher is retracted by the actuator, the workpiece having a retaining clip installed thereon can be removed from the clip installation cavity, the pusher comprising a flat elongate member.

18. An apparatus for installing retaining clips onto workpieces according to claim 17, wherein the pusher includes a central slot the extends through a free end thereof.

19. An apparatus for installing retaining clips onto workpieces, the apparatus comprising;

a housing;

a pusher carried by the housing and movable to push a retaining clip onto a workpiece;

an actuator moving the pusher in a first direction to install the retaining clip on the workpiece and retracting the pusher in a second direction after installation of the retaining clip on the workpiece;

a yieldably biased workpiece alignment member carried by the housing and engaging and positioning the workpiece;

a guide coupled to the housing and configured to receive and store a plurality of retaining clips, the guide being configured to position a lead retaining clip in front of the pusher; and a clip installation cavity defined in the housing and being located adjacent the yieldably biased workpiece alignment member, the yieldably biased workpiece alignment members being engaged by the retaining clip and moved in the first direction out of engagement with the workpiece during movement of the pusher in the first direction, and the yieldably biased workpiece alignment member engaging the retaining clip to move the retaining clip and workpiece in the second direction to initiate ejection of the workpiece with the retaining clip installed thereon during movement of the pusher in the second direction.

20. An apparatus for installing retaining clips onto workpieces according to claim 19, wherein the housing is provided with an inclined interior surface adjacent the clip installation cavity against which an end of a workpiece is pushed by the yieldably biased workpiece alignment member after a retaining clip is installed on the workpiece.

21. An apparatus for installing retaining clips onto workpieces according to claim 20, wherein the inclined interior surface is oriented to deflect the workpiece so that the workpiece is ejected from the clip installation cavity.

22. An apparatus for installing clips onto workpieces according to claim 19, wherein the yieldably biased workpiece alignment member includes an undercut profile which receives an end of the workpiece.

23. An apparatus for installing retaining clips onto workpieces according to claim 22, wherein the yieldably biased workpiece alignment member includes a lip which is adapted to be received in a groove of the workpiece.

24. An apparatus for installing retaining clips onto workpieces according to claim 19, wherein the pusher and yieldably biased workpiece alignment member are configured to provide sufficient clearance therebetween so that, as the pusher is retracted by the actuator, a workpiece having a retaining clip installed thereon is removable from the clip installation cavity.

25. An apparatus for installing retaining clips onto workpieces according to claim 19, further comprising a spring configured to yieldably bias the yieldably biased workpiece alignment member toward the pusher.

26. An apparatus for installing retaining clips onto workpieces according to claim 25, wherein the spring is a coil spring.

27. An apparatus for installing retaining clips onto workpieces according to claim 26, wherein the yieldably biased workpiece alignment member is formed to include a bore and at least a portion of the coil spring is received in the bore.

28. An apparatus for installing retaining clips onto workpieces according to claim 26, wherein the coil spring is oriented parallel with the first direction.

29. An apparatus for installing retaining clips onto workpieces according to claim 19, wherein the pusher comprises a flat elongate member.

30. An apparatus for installing retaining clips onto workpieces according to claim 29, wherein the pusher includes a central slot that opens at a free end of the pusher.

31. An apparatus for installing retaining clips onto workpieces according to claim 19, further comprising a hand operable switch that is movable to actuate the actuator and a foot operable switch that is movable to actuate the actuator.

32. An apparatus for installing a retaining clip onto a workpiece, the apparatus comprising:

a housing having a cavity that receives at least a portion of the workpiece;

a pusher carried by the housing and movable to install the retaining clip onto the workpiece;

an actuator moving the pusher to install the retaining clip onto the workpiece; and a yieldably biased workpiece alignment member carried by the housing and engaging and positioning the workpiece prior to installation of the retaining clip onto the workpiece, the yieldably biased workpiece alignment member being engaged by the retaining clip and moved in a first direction out of engagement with the workpiece during installation of the retaining clip onto the workpiece, and subsequent to installation of the retaining clip onto the workpiece, the yieldably biased workpiece alignment member engaging the retaining clip to move the retaining clip and workpiece in a second direction to initiate ejection of the workpiece with the retaining clip installed thereon out of the cavity formed in the housing.

33. An apparatus for installing a retaining clip onto a workpiece according to claim 32, wherein the second direction is parallel with and opposite to the first direction.

34. An apparatus for installing a retaining clip onto a workpiece according to claim 32, wherein the housing is formed to include an inclined surface and the workpiece contacts the inclined surface during movement of the yieldably biased workpiece alignment member in the second direction.

35. An apparatus for installing a retaining clip onto a workpiece according to claim 34, wherein the inclined surface is oriented to deflect the workpiece so that the workpiece is fully ejected out of the cavity.

36. An apparatus for installing a retaining clip onto a workpiece according to claim 32, wherein the yieldably biased workpiece alignment member is formed to include a curved portion that engages the workpiece prior to installation of the retaining clip on the workpiece and that engages the retaining clip subsequent to installation of the retaining clip on the workpiece.

37. An apparatus for installing a retaining clip onto a workpiece according to claim 32, further comprising a spring configured to yieldably bias the yieldably biased workpiece alignment member toward the pusher.

38. An apparatus for installing a retaining clip onto a workpiece according to claim 37, wherein the spring is a coil spring.

39. An apparatus for installing a retaining clip onto a workpiece according to claim 38, wherein the yieldably biased workpiece alignment member is formed to include a bore and at least a portion of the coil spring is received in the bore.

40. An apparatus for installing a retaining clip onto a workpiece according to claim 38, wherein the coil spring is oriented parallel with the first direction.

41. An apparatus for installing a retaining clip onto a workpiece according to claim 32, wherein the pusher comprises a flat elongate member.

42. An apparatus for installing a retaining clip onto a workpiece according to claim 41, wherein the pusher includes a central slot that opens at a free end of the pusher.

43. An apparatus for installing a retaining clip onto a workpiece according to claim 32, further comprising a hand operable switch that is movable to actuate the actuator and a foot operable switch that is movable to actuate the actuator.

* * * * *